United States Patent
Wang (10) Patent No.: US 9,362,811 B2
(45) Date of Patent: Jun. 7, 2016

(54) ELECTROMAGNETIC DRIVER WITH LEAD-OUT STRUCTURE FOR COIL

(71) Applicant: TDK TAIWAN Corporation, Taipei (TW)

(72) Inventor: Hung-Lin Wang, Yangmei Taoyuan (TW)

(73) Assignee: TDK TAIWAN CORPORATION, Taipei (TW)

( * ) Notice: Subject to any disclaimer, the term of this patent is extended or adjusted under 35 U.S.C. 154(b) by 236 days.

(21) Appl. No.: 14/253,717

(22) Filed: Apr. 15, 2014

(65) Prior Publication Data

US 2015/0295486 A1    Oct. 15, 2015

(51) Int. Cl.
*H02K 41/02*    (2006.01)
*H02K 41/035*    (2006.01)

(52) U.S. Cl.
CPC .................................. *H02K 41/0356* (2013.01)

(58) Field of Classification Search
CPC ....... H02K 41/0356; H02K 3/46; H02K 3/34; H02K 3/50
USPC .......................... 310/12.02, 12.16, 12.21, 71
See application file for complete search history.

(56) References Cited

U.S. PATENT DOCUMENTS

| | | | | |
|---|---|---|---|---|
| 2011/0249352 A1* | 10/2011 | Ku | ........................... | F16F 1/027 359/824 |
| 2012/0008220 A1* | 1/2012 | Lee | ........................... | G03B 3/10 359/822 |
| 2012/0013202 A1* | 1/2012 | Lee | ........................... | H02K 33/04 310/12.16 |
| 2014/0097707 A1* | 4/2014 | Hou | ................... | H02K 41/0356 310/12.16 |
| 2015/0043093 A1* | 2/2015 | Lin | ........................... | G02B 7/08 359/811 |

* cited by examiner

*Primary Examiner* — Thanh Lam
(74) *Attorney, Agent, or Firm* — Muncy, Geissler, Olds & Lowe, P.C.

(57) ABSTRACT

An electromagnetic driver with lead-out structure for coil includes at least one coil holder and at least one coil disposed on the coil holder. The coil holder has a plurality of metal connecting member, and the two lead-out ends of the coil are electrically connected to the first connecting terminals of the metal connecting members. The second connecting terminal of the metal connecting member is electrically connected to a conductive member, such as spring, and the coil of the electromagnetic driver can be independently and automatically manufactured and then assembled with the other conductive member. The coil of the electromagnetic driver can be directly replaced at maintenance.

16 Claims, 10 Drawing Sheets

ELECTROMAGNETIC DRIVER WITH LEAD-OUT STRUCTURE FOR COIL

BACKGROUND OF THE INVENTION

1. Field of the Invention

The present invention relates to an electromagnetic driver with lead-out structure for coil, especially to an electromagnetic driver such as voice coil motor or actuator with lead-out structure for coil.

2. Description of Prior Art

Figure 1:
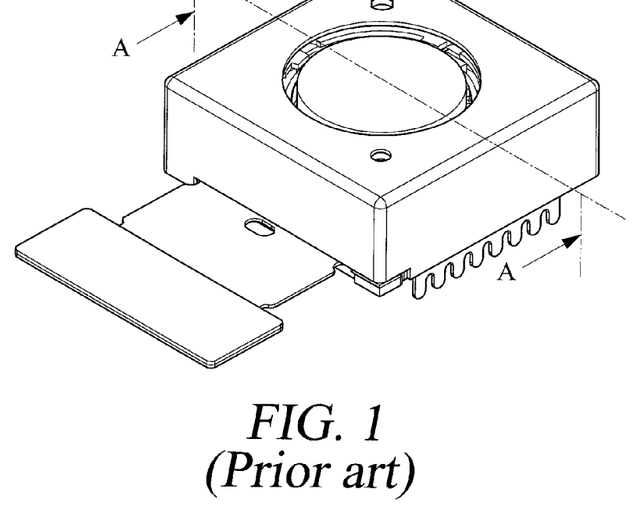
FIG. 1 shows a schematic diagram of a prior art lens focusing mechanism with image stabilization.
Figure 2:
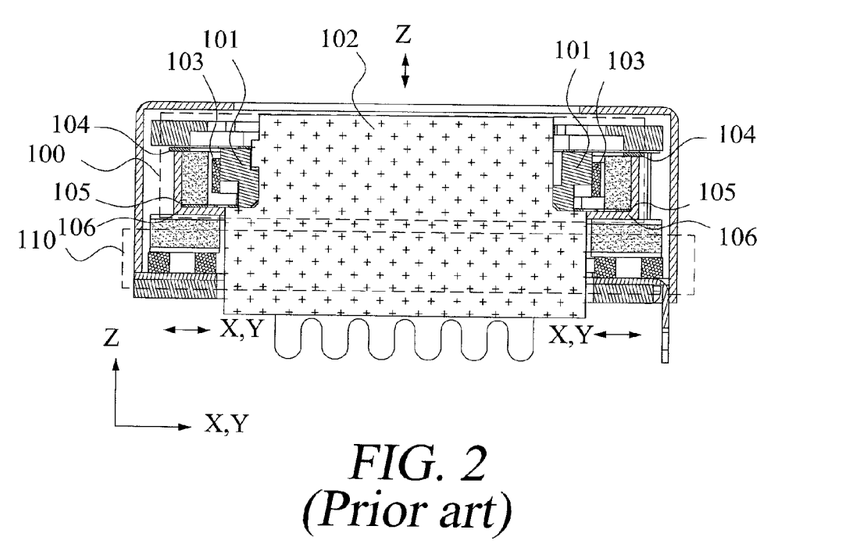
FIG. 2 shows a sectional view along line A-A in FIG. 1.

Electromagnetic drivers such as voice coil motors (VCM) and electromagnetic actuators are widely used in controlling lens movement for autofocus camera. FIG. 1 shows a schematic diagram of a prior art lens focusing mechanism with image stabilization, and FIG. 2 shows a sectional view along line A-A in FIG. 1. The lens focusing mechanism shown in FIG. 1 employs voice coil motor 100 for focus control along Z axis (zooming in and zooming out direction) and actuator for image compensation in X-Y planes to provide stabilization. More particularly, the voice coil motor and the actuator are operated by applying current through coil to generate electromagnetic field and the electromagnetic field has interaction (repulsive or attractive action) with magnet. To connect the connecting wire of coil to the relevant electric conductive member (such as spring), the connecting wire of coil is soldered to the conductive member and hen the conductive member is electrically connected to the driver. Therefore, electric current can be conducted to the coil for further magnetization.

However, the soldering task for the coil wire become more difficult as the electromagnetic drivers used for mobile phones and cameras are more compact. Moreover, the electromagnetic drivers are also difficult to automatically manufacture because manual labor is required for soldering. Taking the manufacture of voice coil motor as example, the voice coil motor 100 shown in FIG. 2 has a lens holder 101, lens 102 arranged inside the lens holder 101, a coil 103 around the lens holder 101, upper and lower springs (resilient plates) 104 and 105 arranged atop and below the lens holder 101. During the manufacture of voice coil motor, the lower spring 105 is first assembled to a base 106, and then the lens holder 101 is connected to the lower spring 105. Afterward, the coil 103 is wound around the lens holder 101 and the lead-out wire of the coil is soldered to the lower spring 105, whereby the process for assembling other components can be followed. The soldering of the lead-out wire of the coil to the lower spring 105 needs to be performed manually, thus the process is inconvenient.

SUMMARY OF THE INVENTION

One of the objects of the present invention is to overcome the drawbacks of failing to automatic manufacture and maintenance difficulty in conventional electromagnetic driver. Accordingly, the present invention provides an improved electromagnetic driver with coil holder having lead-out structure for coil. The coil holder has metal connecting member connected to lead-out wires of coil. The metal connecting member is further connected to conductive terminal or spring. Therefore, the coil and the coil holder can be individually and automatically manufactured with other components and then assembled with the conductive terminal or spring, thus enhancing manufacture efficiency.

Accordingly, the present invention provides an electromagnetic driver with lead-out structure for coil. The coil assemble of the electromagnetic driver comprises at least a coil holder and a coil arranged on the coil holder. The coil holder has a plurality of metal connecting members thereon. Each of the metal connecting members has a first connecting terminal and a second connecting terminal The first connecting terminal is electrically connected to a lead-out wire of the coil and the second connecting terminal is electrically connected to a conductive member. At least a magnetic member is arranged corresponding to the coil assemble and separated with the coil assemble. The magnetic member has electromagnetic interaction with the coil when electric current flows through the coil.

According to another aspect of the present invention, the coil constitutes stator while the magnetic member constitutes rotor and arranged at a center of hollow encircled by the coil holder. The coil constitutes rotor while the magnetic member constitutes stator and arranged around the coil holder or arranged atop or below the coil.

According to still another aspect of the present invention, the metal connecting members are integrally formed with the coil holder and embedded into the coil holder when the coil holder is inject molded. The coil holder has a plurality of embedding grooves and the metal connecting members are arranged in the embedding grooves.

According to still another aspect of the present invention, the lead-out wire of the coil is first wound around the first connecting terminal of the metal connecting member and then soldered to the first connecting terminal.

According to still another aspect of the present invention, the second connecting terminal of the metal connecting member is soldered to the conductive member. The second connecting terminal of the metal connecting member is connected to the conductive member by locking structure with hook and locking recess.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

In the present invention, the electromagnetic driver can be voice coil motor, electromagnetic motor or electromagnetic actuator and so on. The embodiments of the present invention are exemplified with electromagnetic driver with specific structures. However, the scope of the present invention is not limited the demonstrated embodiments.

Figure 3A:
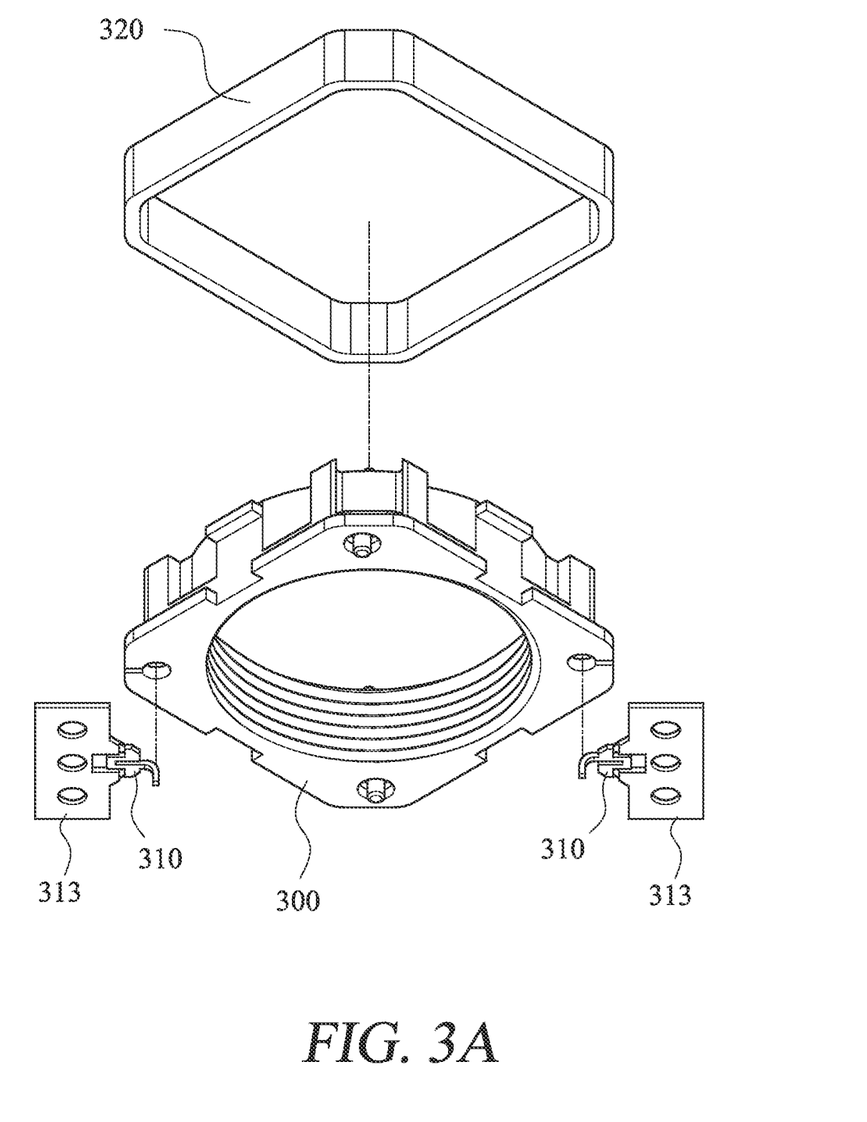
FIG. 3A shows an exploded view of the coil assembly according to an embodiment of the present invention, where the electromagnetic driver is realized by a voice coil motor.
Figures 3B, 3C:
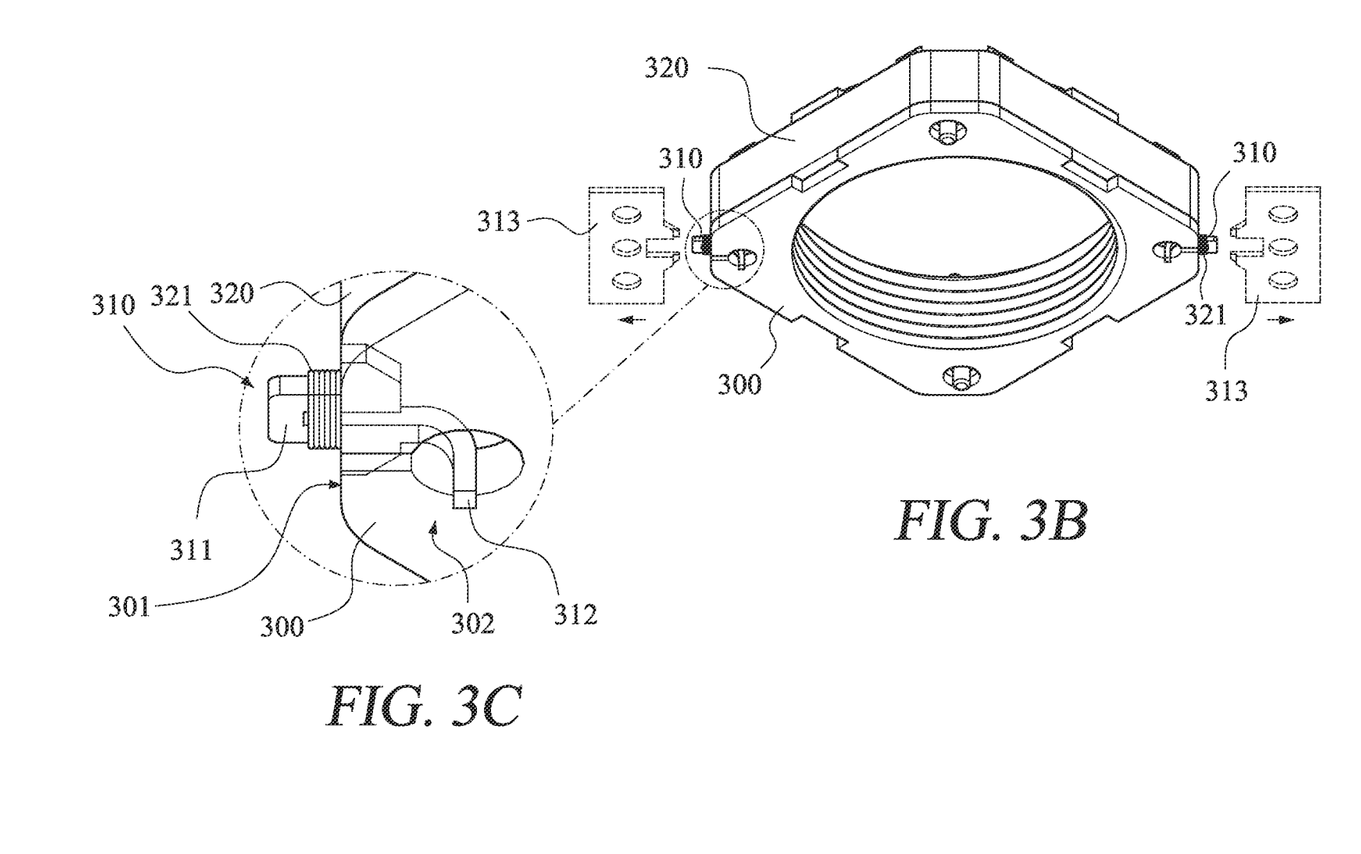
FIG. 3B shows a perspective view corresponding to FIG. 3A.
FIG. 3C is a partially enlarged view of FIG. 3B.

FIG. 3A shows an exploded view of the coil assembly according to an embodiment of the present invention, where the electromagnetic driver is realized by a voice coil motor (hereinafter VCM based driver). FIG. 3B shows a perspective view corresponding to FIG. 3A and FIG. 3C is a partially enlarged view of FIG. 3B. The electromagnetic driver according to the shown embodiment comprises at least a coil holder 300 such a lens holder of ring shape with hollow center and made of non-conductive material such as plastic material. A lens (not shown) is arranged at the center of the coil holder 300 and the coil holder 300 comprises two metal connecting members 310. The metal connecting members 310 can be integrally formed with the coil holder 300 and embedded on the coil holder 300 when the coil holder 300 is manufactured by mold injection. As shown in FIG. 3A, in semi-finished stage, positioning members 313 are used to fix the metal connecting members 310 to the molding die (not shown) for the coil holder 300. After the coil holder 300 is formed, the positioning members 313 are removed as shown in FIG. 3B.

As shown in FIG. 3C, each of the metal connecting members 310 has a first connecting terminal 311 and a second connecting terminal 312. The first connecting terminal 311 is arranged on outer annular face 301 of the coil holder 300 and projects out of the outer annular face 301. The second connecting terminal 312 is arranged on a side face 302 of the coil holder 300 and extends downward out of the side face 302.

The first connecting terminal 311 is substantially perpendicular to the second connecting terminal 312.

Figure 4A:
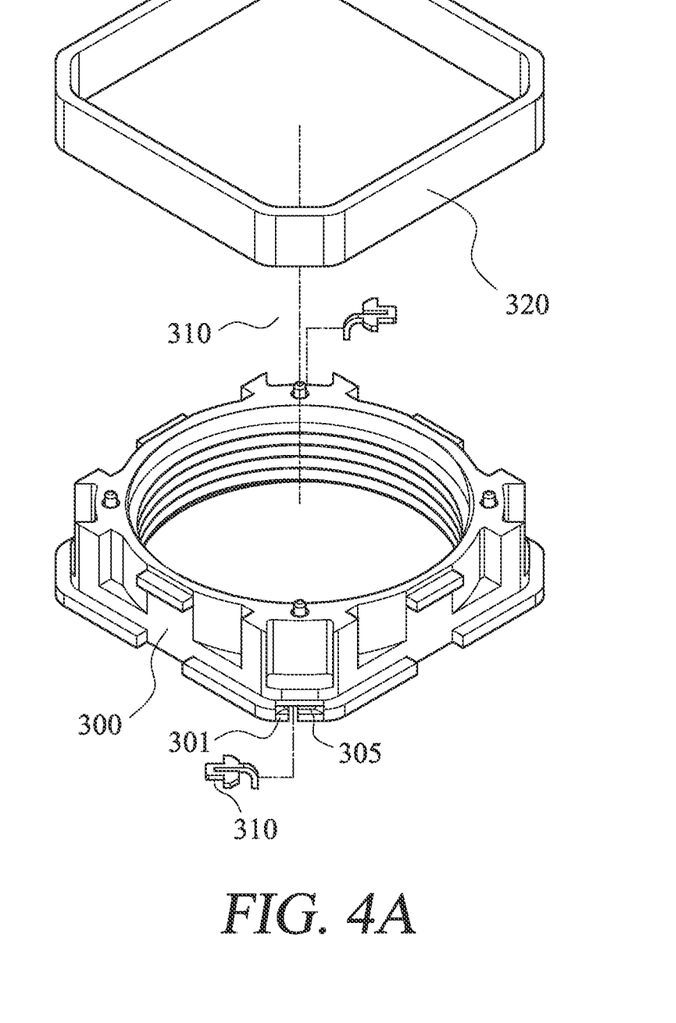
FIG. 4A shows an exploded view of the coil assembly according to another embodiment of the present invention, where the electromagnetic driver is realized by a voice coil motor.
Figure 4B:
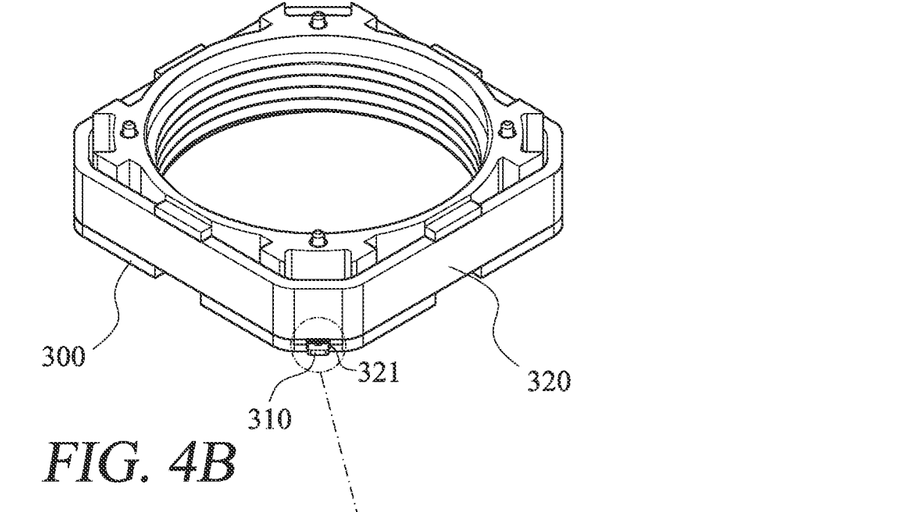
FIG. 4B shows a perspective view corresponding to FIG. 4A.
Figure 4C:
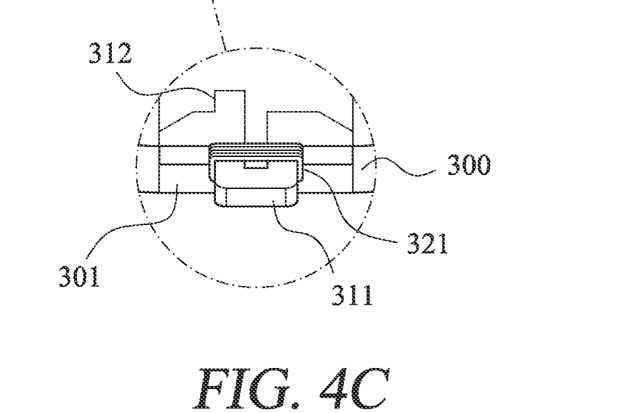
FIG. 4C is a partially enlarged view of FIG. 4B.

FIG. 4A shows an exploded view of the coil component according to another embodiment of the present invention, where the electromagnetic driver is also realized by a voice coil motor. FIG. 4B shows a perspective view corresponding to FIG. 4A and FIG. 4C is a partially enlarged view of FIG. 4B. As shown in FIG. 4A, the coil holder 300 has a plurality of embedding grooves 305 defined thereon and defined on the outer annular face 301 of the coil holder 300. The metal connecting members 310 are respectively arranged in the embedding grooves 305. As shown in FIGS. 4B and 4C, the first connecting terminal 311 of each metal connecting member 310 projects out of the outer annular face 301. The second connecting terminal 312 of each metal connecting member 310 extends into the coil holder 300 and toward a side face of the coil holder 300 (similar to that shown in FIG. 3C).

With reference now to FIGS. 3A-3C and FIGS. 4A-4C, in these two embodiments, a coil 320 of annulus hollow shape is arranged on the outer annular face 301 of the coil holder 300. The coil 320 has two lead-out wires 321 connected respectively to the two metal connecting members 310. The lead-out wires 321 of the coil 320 are wound around the first connecting terminals 311 of the metal connecting members 310 and tin solder can be used to further connect the lead-out wires 321 and the first connecting terminals 311.

Figure 5:
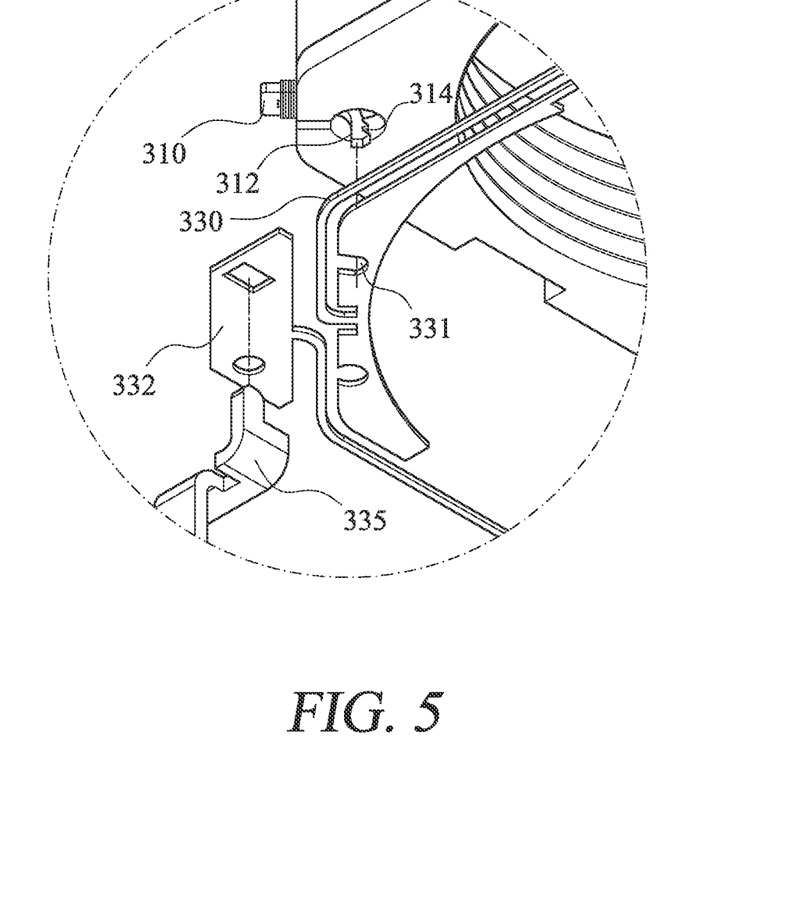
FIG. 5 shows a partially enlarged view for the VCM based driver.

FIG. 5 shows a partially enlarged view for the VCM-based driver. An electric conductive member 330 such as a spring is electrically connected to the second connecting terminal 312 of each metal connecting member 310. In this embodiment, locking structure is provided on the metal connecting member 310 and the electric conductive member 330. For example, the second connecting terminal 312 of each metal connecting member 310 has an uneven hook 314 at tail end thereof, and the electric conductive member 330 (such as spring) has a locking recess 331 at movable part (inner ring) thereof The hook 314 extends into the locking recess 331 and is locked with the locking recess 331. The fixed part (outer ring) 332 of the spring 330 is connected to an outer frame (shown in FIG. 6) or connected to a conductive pin 335. The metal connecting member 310 and the electric conductive member 330 can be assembled by means other than the above-mentioned locking structure. The locking structure is used only for demonstration and provides convenience of easy assembling/disassembling. According to another example, the metal connecting member 310 and the electric conductive member 330 can be assembled by solder or glue dispensing.

Figure 6:
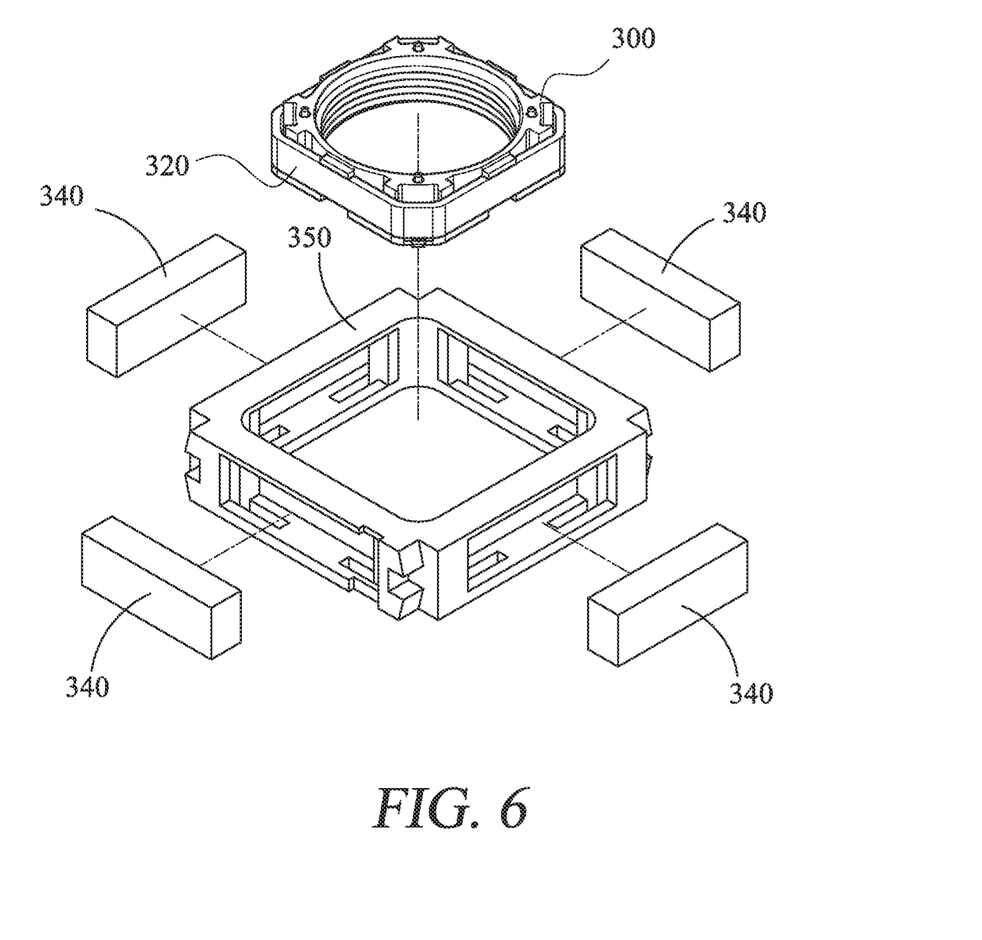
FIG. 6 shows a partially exploded view for the VCM based driver.

FIG. 6 shows a partially exploded view for the VCM-based driver. In the embodiment shown in FIG. 6, the electromagnetic driver further comprises magnetic members 340 such as four magnets arranged outside the coil 320 and the coil holder 300, and separated with the coil 320. The four magnets 340 can be fixed by the outer frame 350 and the coil holder 300 is suspended amid the four magnets 340 by the spring (not shown in FIG. 6). Therefore, the coil 320 and the coil holder 300 constitute the movable component (also referred to as rotor) moving along a center surrounded by the four magnets 340, and the magnetic members 340 constitute the fixed component (also referred to as stator). The coil 320 generates electromagnetic field as electric current flowing therethrough and the electromagnetic field has magnetic interaction (such as repulsive force) with the magnetic members 340. In the VCM-based driver in the present invention, the magnetic repulsive force can move the lens carried by the coil holder 300 (rotor) up and down for image focusing.

Figure 7:
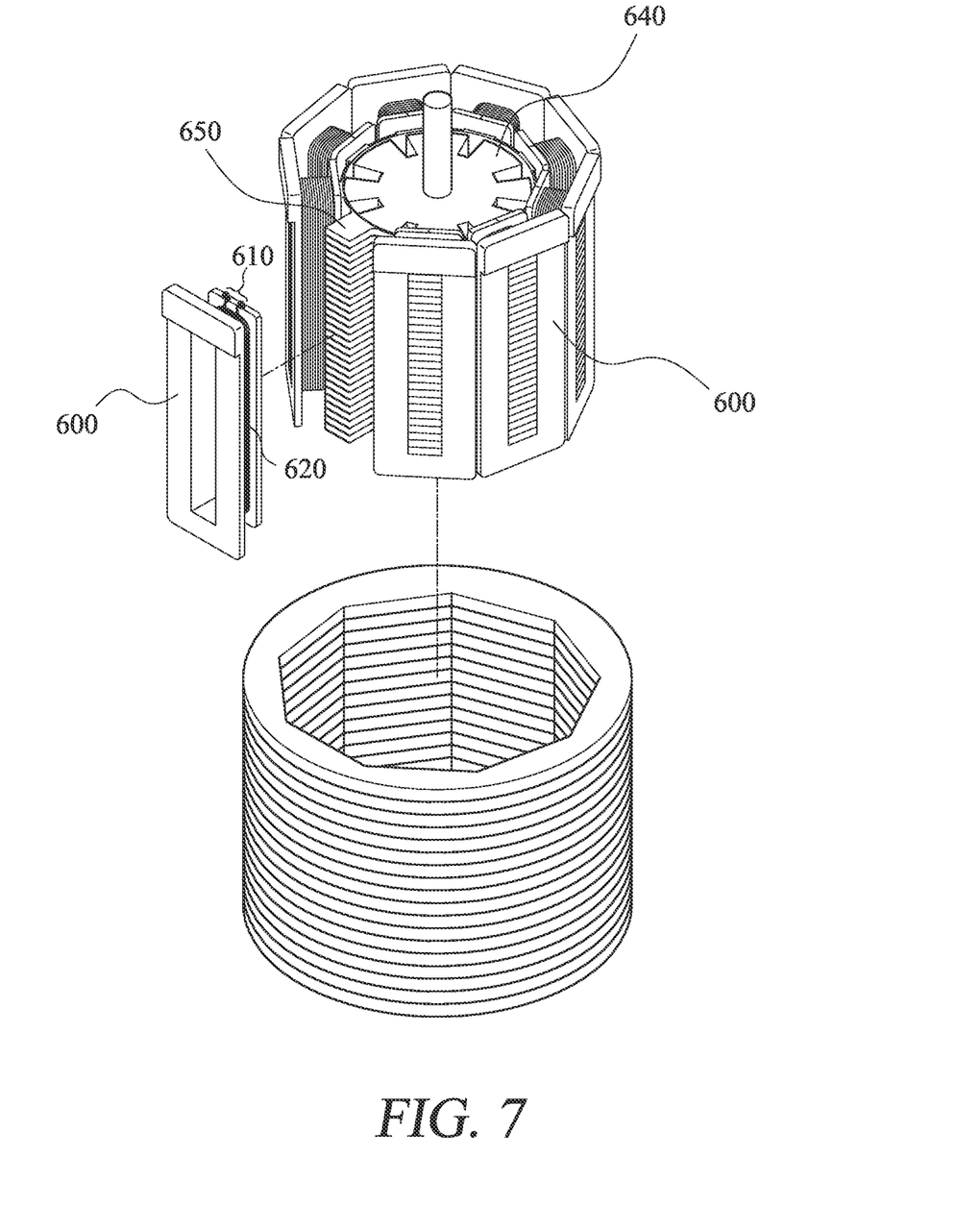
FIG. 7 shows an exploded view of the VCM based driver according to another embodiment of the present invention.

FIG. 7 shows an exploded view of the VCM based driver according to another embodiment of the present invention. The VCM based driver comprises a plurality of coil holders 600 and each of the coil holders 600 is wound with coil 620 thereon. At least one coil holder 600 has two metal connecting members 610 respectively connected to two lead-out wires extended from two ends of the coil 620. The plurality of coil holders 600 are arranged on teeth grooves of a silicon steel ring 650. The silicon steel ring 650 can be one-piece formed by silicon steel or constituted by a plurality of silicon steel teeth. The coil holders 600 are such arranged that a hollow is defined at the center of the arranged coil holders 600. The magnetic member 640 is formed as central shaft and arranged at the center of the coil holders 600. The magnetic member 640 can be embodied with one-phase motor formed by one magnet, or multiple-phase motor (or step motor) formed by a plurality of magnets. In the shown embodiment, the coil holders 600, the silicon steel ring 650 and the coil 620 constitute stator, and the magnetic member 640 constitute rotor. When current flows through the coil 620, the central shaft provided by the magnetic member 640 is rotated. In another embodiment (not shown), the plurality of coil holders 600 constitute a stator of hollow ring shape, and the coil 620 is arranged at the center of the hollow to function as rotor and constitute the VCM based motor with the coil holders 600.

Figure 8A:
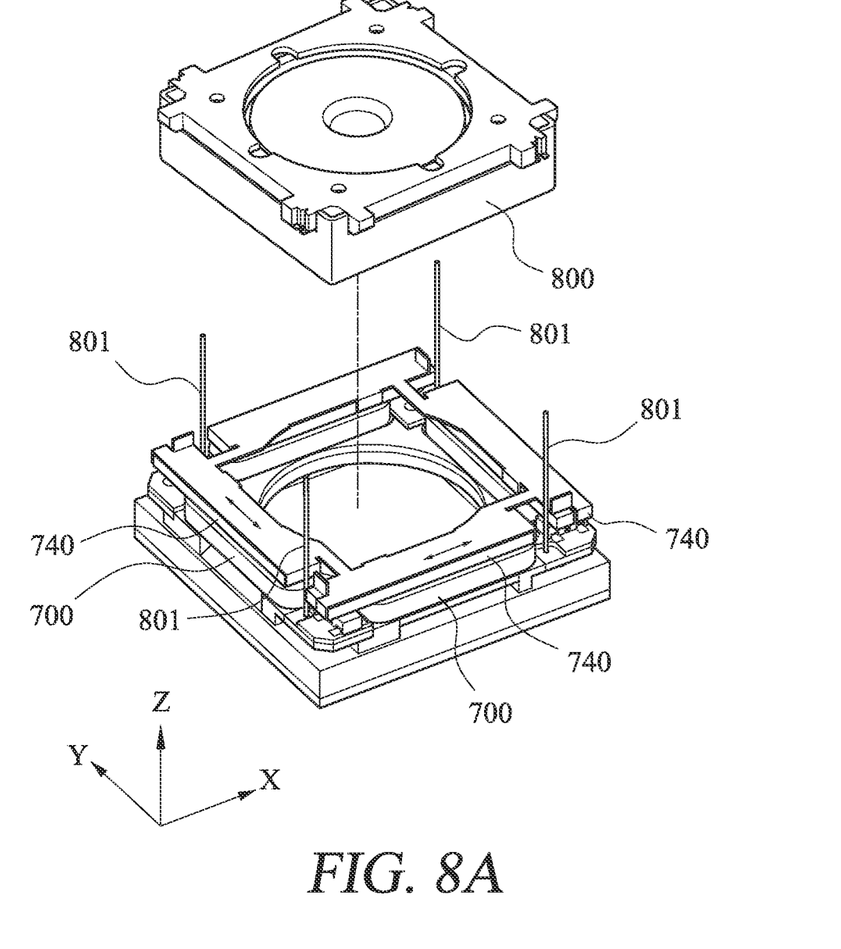
FIG. 8A shows an exploded view of an electromagnetic actuator according to another embodiment of the present invention.
Figure 8B:
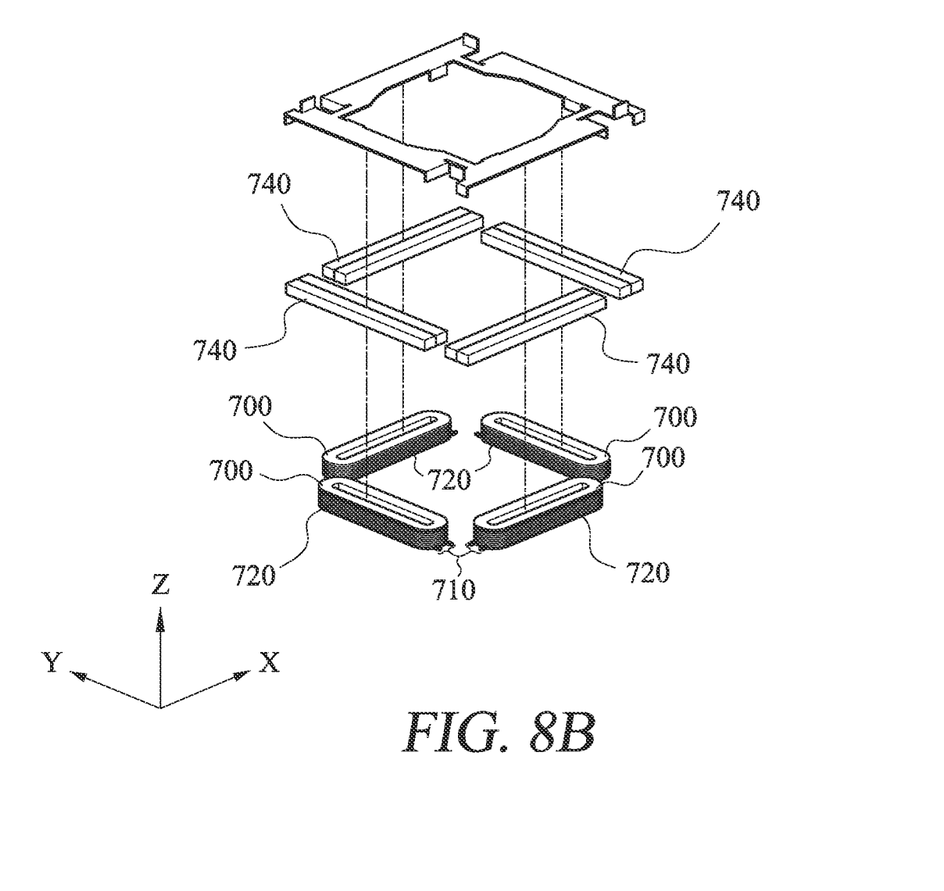
FIG. 8B shows the exploded view of partial elements of the electromagnetic actuator in FIG. 8A.

FIG. 8A shows an exploded view of an electromagnetic actuator according to another embodiment of the present invention. FIG. 8B shows the exploded view of partial elements of the electromagnetic actuator in FIG. 8A. In the shown embodiment, the electromagnetic driver is the electromagnetic actuator providing X-Y axis movement. The VCM lens 800 is supported by four hanging wires 801. Four magnetic members 740 are arranged below the VCM lens 800 and corresponding to four coil holders 700. Each of the coil holders 700 is flat plate with I-shaped cross section. A coil 720 is wound around the coil holder 700 and the lead-out wires extended from two ends of the coil 720 are electrically connected to metal connecting member 710. The magnetic members 740 are arranged atop or below the coil 720 such that the coil 720 and the magnetic members 740 constitute stator and rotor, and vice versa. For example, the magnetic members 740 constitute stator when the coil 720 constitutes rotor. The magnetic members 740 constitute rotor when the coil 720 constitutes stator. The coil 720 and the magnetic members 740 have magnetic interaction for providing horizontal movement when electric current flows through the coil 720. The electromagnetic actuator according to this embodiment can be used for image compensation for lens with image stabilization function. Taking the X-Y axis orientation shown in FIGS. 1 and 2, and FIGS. 8A and 8B as example, one set of electromagnetic actuator can provide X-axis image compensation, while another set of electromagnetic actuator can provide Y-axis image compensation.

To sum up, the present invention provides electromagnetic driver with lead-out structure and the lead-out structure can be applied to electromagnetic motor or electromagnetic actuator constituted by coil and magnet to automatically manufacture coil assemble for the electromagnetic driver. The manual labor for soldering can be eliminated and the damaged coil assemble can be easily replaced for further recycling.

Although the present invention has been described with reference to the preferred embodiment thereof, it will be understood that the invention is not limited to the details thereof Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An electromagnetic driver with lead-out structure for coil, the electromagnetic driver comprising:
    at least one coil assemble, the coil assemble comprising
        a coil holder made of non-conductive material;
        a plurality metal connecting members arranged on the coil holder and each of the metal connecting members comprising a first connecting terminal and a second connecting terminal, the second connecting terminal electrically connected to a conductive member; and
    at least one coil arranged on the coil holder and having two lead-out wires extended from two end of the coil, the two lead-out wires respectively connected to the first connecting terminals of the metal connecting members; and
    the electromagnetic driver further comprising at least one magnetic member arranged corresponding to the coil, the magnetic member having electromagnetic interaction with the coil when electric current flows through the coil.

2. The electromagnetic driver in claim 1, wherein the metal connecting members are integrally formed with the coil holder and embedded into the coil holder when the coil holder is inject molded.

3. The electromagnetic driver in claim 1, wherein the coil holder has a plurality of embedding grooves and the metal connecting members are arranged in the embedding grooves.

4. The electromagnetic driver in claim 1, wherein the two lead-out wires of the coil are respectively connected to two metal connecting members, each of the lead-out wires of the coil is wound around and soldered to the first connecting terminal of the corresponding metal connecting member.

5. The electromagnetic driver in claim 1, wherein the second connecting terminal of the metal connecting member is soldered to the conductive member or glue-dispensed to the conductive member.

6. The electromagnetic driver in claim 1, wherein the second connecting terminal of the metal connecting member is connected to the conductive member by locking structure.

7. The electromagnetic driver in claim 1, wherein the conductive member is a spring.

8. The electromagnetic driver in claim 1, wherein the magnetic member constitutes a rotor for the electromagnetic driver when the coil constitutes a stator; wherein the magnetic member constitutes a stator for the electromagnetic driver when the coil constitutes a rotor.

9. The electromagnetic driver in claim 8, wherein the coil holder of ring shape with a hollow center.

10. The electromagnetic driver in claim 9, wherein the coil holder is a lens holder.

11. The electromagnetic driver in claim 10, wherein the coil constitutes a rotor and the magnetic members are plural and arranged around the coil, the magnetic members constitute stators, and the coil holder moves up and down when the coil has magnetic interaction with the magnetic members.

12. The electromagnetic driver in claim 8, wherein the coil constitutes stator and the magnetic member constitutes rotor and is arranged at a center encircled by the coil stage, the magnetic member moves up and down when the coil has magnetic interaction with the magnetic members.

13. The electromagnetic driver in claim 3, wherein the coil constitutes stator and the magnetic member constitutes rotor and is arranged as a rotating shaft encircled by the coil stage, the magnetic member rotates when the coil has magnetic interaction with the magnetic members.

14. The electromagnetic driver in claim 2, wherein the magnetic member is arranged atop or below the coil.

15. The electromagnetic driver in claim 8, wherein the magnetic member constitutes stator and the coil constitutes rotor, the coil has horizontal movement when the coil has magnetic interaction with the magnetic member.

16. The electromagnetic driver in claim 8, wherein the magnetic member constitutes rotor and the coil constitutes stator, the magnetic member has horizontal movement when the coil has magnetic interaction with the magnetic member.

* * * * *